(12) United States Patent
Lee et al.

(10) Patent No.: US 11,405,894 B2
(45) Date of Patent: Aug. 2, 2022

(54) SYSTEM AND METHOD OF ESTABLISHING COMMUNICATION FOR EXCHANGING RANGING INFORMATION

(71) Applicant: Samsung Electronics Co., Ltd., Suwon-si (KR)

(72) Inventors: Wook Bong Lee, San Jose, CA (US); Ashok Ranganath, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 16/867,197

(22) Filed: May 5, 2020

(65) Prior Publication Data

US 2021/0014844 A1    Jan. 14, 2021

Related U.S. Application Data

(60) Provisional application No. 62/872,124, filed on Jul. 9, 2019.

(51) Int. Cl.
| | |
|---|---|
| *H04W 4/00* | (2018.01) |
| *H04W 72/04* | (2009.01) |
| *H04W 4/80* | (2018.01) |
| *H04B 1/7163* | (2011.01) |
| *H04W 4/02* | (2018.01) |

(52) U.S. Cl.
CPC ...... *H04W 72/0406* (2013.01); *H04B 1/7163* (2013.01); *H04W 4/023* (2013.01); *H04W 4/80* (2018.02)

(58) Field of Classification Search
CPC ... H04W 72/0406; H04W 4/023; H04W 4/80; H04W 72/04; H04B 1/7163

USPC ............................................... 370/329
See application file for complete search history.

(56) References Cited

U.S. PATENT DOCUMENTS

| | | | |
|---|---|---|---|
| 2005/0058107 A1 | 3/2005 | Salokannel et al. | |
| 2005/0094593 A1 | 5/2005 | Buckley | |
| 2005/0143101 A1* | 6/2005 | Kyperountas | G01S 5/0289 455/456.6 |
| 2006/0025180 A1 | 2/2006 | Rajkotia et al. | |

(Continued)

FOREIGN PATENT DOCUMENTS

WO    2019/067105 A1    4/2019

OTHER PUBLICATIONS

EPO Extended European Search Report dated Nov. 5, 2020, issued in corresponding European Patent Application No. 20175699.6 (10 pages).

*Primary Examiner* — Marceau Milord
(74) *Attorney, Agent, or Firm* — Lewis Roca Rothgerber Christie LLP

(57) ABSTRACT

A method of establishing communication between a first device and a second device to exchange ranging information is provided. According to an embodiment, the method includes: sending, by the first device to the second device via a first channel, or receiving, by the first device from the second device via the first channel, a first control message indicating a start time; sending, by the first device to the second device via a second channel, a second control message including one or more ranging parameter values for exchanging the ranging information, the second control message being sent at the start time; and exchanging, by the first device with the second device via the second channel, the ranging information over one or more ranging rounds.

19 Claims, 5 Drawing Sheets

(56) References Cited

U.S. PATENT DOCUMENTS

| | | | |
|---|---|---|---|
| 2006/0214848 A1* | 9/2006 | Roberts | G01S 11/06 |
| | | | 342/458 |
| 2006/0259574 A1* | 11/2006 | Rosenberg | H04L 67/18 |
| | | | 709/217 |
| 2007/0141984 A1 | 6/2007 | Kuehnel et al. | |
| 2007/0184864 A1* | 8/2007 | Leitch | H04W 52/0219 |
| | | | 455/507 |
| 2007/0293237 A1* | 12/2007 | Correal | H04W 4/02 |
| | | | 455/456.1 |
| 2008/0246651 A1* | 10/2008 | Schmidt | H04W 64/006 |
| | | | 342/352 |
| 2010/0035629 A1 | 2/2010 | Soliman | |
| 2013/0290565 A1* | 10/2013 | Kamakura | G06F 21/70 |
| | | | 709/245 |
| 2014/0073244 A1* | 3/2014 | Ko | H04W 4/80 |
| | | | 455/41.1 |
| 2014/0211720 A1 | 7/2014 | Thoukydides | |
| 2014/0357194 A1* | 12/2014 | Jin | H04W 8/005 |
| | | | 455/41.2 |
| 2016/0378174 A1 | 12/2016 | Meng et al. | |
| 2017/0055276 A1* | 2/2017 | Callard | H04W 72/12 |
| 2017/0231016 A1* | 8/2017 | Park | H04W 12/068 |
| 2017/0243485 A1* | 8/2017 | Rubin | H04L 67/12 |
| 2017/0261591 A1* | 9/2017 | Zhang | G01S 5/14 |
| 2018/0011179 A1* | 1/2018 | Zhang | H04L 69/22 |
| 2018/0084384 A1* | 3/2018 | Venkatraman | H04W 76/16 |
| 2018/0084517 A1* | 3/2018 | Do | H04W 60/00 |
| 2018/0084537 A1* | 3/2018 | Do | H04W 12/084 |
| 2018/0131540 A1* | 5/2018 | Malik | H04L 27/2663 |
| 2019/0052995 A1* | 2/2019 | Agrawal | H04W 4/38 |
| 2019/0135229 A1* | 5/2019 | Ledvina | H04W 4/023 |
| 2020/0068520 A1* | 2/2020 | Marri Sridhar | G01S 13/765 |
| 2020/0106877 A1* | 4/2020 | Ledvina | H04W 4/026 |
| 2020/0196323 A1* | 6/2020 | Church | H04W 4/80 |
| 2020/0383036 A1* | 12/2020 | Abe | H04W 48/10 |

* cited by examiner

SYSTEM AND METHOD OF ESTABLISHING COMMUNICATION FOR EXCHANGING RANGING INFORMATION

PRIORITY

This application is based on and claims the benefit of and priority under 35 U.S.C. § 119(e) to a U.S. Provisional Patent Application filed on Jul. 9, 2019 in the United States Patent and Trademark Office and assigned Ser. No. 62/872,124, the entire contents of which are incorporated herein by reference.

FIELD

The present disclosure generally relates to wireless communication systems. In particular, the present disclosure is related to a system and method of establishing communication between wireless communication systems to exchange ranging information.

BACKGROUND

Ranging generally refers to a process of establishing a target distance. Two wireless communications systems or devices may perform ranging to determine the distance between them, for example, by exchanging ranging information via radio frequency (RF) signals, determining a time-of-flight (ToF) of the RF signals based on the ranging information, and calculating the distance by multiplying the ToF by the speed of light.

If two devices are synchronized, one-way ranging (OWR) may be performed to determine the distance between the two devices; otherwise, two-way ranging (TWR) may be performed. OWR generally entails a one-way exchange in which a first device sends ranging information to a second device, whereas TWR generally entails a two-way exchange of ranging information in which both the first device and the second device send ranging information to each other.

Mobile devices that have ranging capabilities are more spatially aware and, through that spatial awareness, are able to offer a growing number of exciting features to users. As such, there are efforts to develop and standardize protocols for ranging. One such effort is the FiRa Consortium, which is dedicated to the development and widespread adoption of seamless user experiences using the secured fine ranging and positioning capabilities of interoperable Ultra-Wideband (UWB) technologies in the frequency range of 6.5 GHz to 9 GHz.

SUMMARY

According to one or more embodiments, a method of establishing communication between a first device and a second device to exchange ranging information includes: sending, by the first device to the second device via a first channel, or receiving, by the first device from the second device via the first channel, a first control message indicating a start time; sending, by the first device to the second device via a second channel, a second control message including one or more ranging parameter values for exchanging the ranging information, the second control message being sent at the start time; and exchanging, by the first device with the second device via the second channel, the ranging information over one or more ranging rounds.

According to one or more embodiments, a method of establishing communication between a first device and a second device to exchange ranging information includes: sending, by the second device to the first device via a first channel, or receiving, by the second device from the first device via the first channel, a first control message indicating a start time; determining, by the second device, an enable time based on the start time; enabling a first circuit on the second device at the enable time, the first circuit being configured to support communication over a second channel; and exchanging, by the second device with the first device via the second channel, the ranging information over one or more ranging rounds.

BRIEF DESCRIPTION OF THE DRAWINGS

The above and other aspects and features of certain embodiments of the present disclosure will be more apparent from the following detailed description, taken in conjunction with the accompanying drawings, in which.

DETAILED DESCRIPTION

Figure 1:
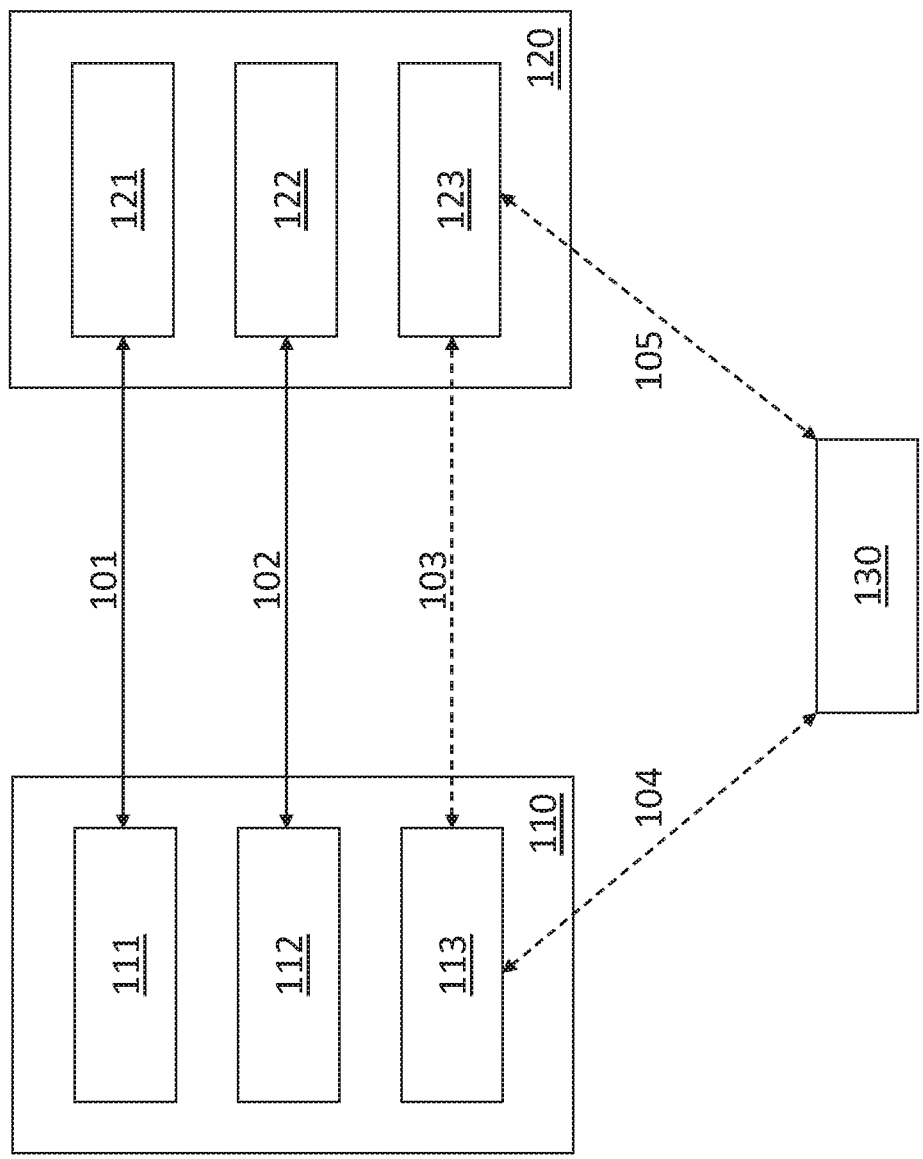
FIG. 1 illustrates a diagram of first and second wireless devices establishing communication to exchange ranging information, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions may be omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one or more embodiments of the present disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may be used interchangeably with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

FIG. 1 illustrates a diagram of first and second wireless devices establishing communication to exchange ranging information, according to an embodiment. A first device 110 includes a first communications circuit 111, a second communications circuit 112, and a third communications circuit 113. Similarly, a second device 120 includes a first communications circuit 121, a second communications circuit 122, and a third communications circuit 123.

The first communications circuit 111 (or 121), the second communications circuit 112 (or 122), and the third communications circuit 113 (or 123) may include one or more transmitter/receiver/transceiver circuits coupled to one or more antennas and operate with various communications technologies, protocols and/or frequencies. For example, the first communications circuit 111 (or 121) may be configured to communicate using Bluetooth Low Energy (BLE) technology, the second communications circuit 112 (or 122) may be configured to communicate using UWB technology as specified by the IEEE 802.15.4 standard family, and the third communications circuit 113 (or 123) may be configured to communicate using Wi-Fi technology as specified by the IEEE 802.11 standard family.

The first device 110 and the second device 120 may communicate with each other or with other devices via their communications circuits. For example, as shown in FIG. 1, the first device 110 and the second device 120 may communicate with each other via a first communications channel 101 and a second communications channel 102 by operating, respectively, their first communications circuit 111 (121) and the second communications circuit 112 (122). The first device 110 and the second device 120 may also communicate with each other via a communications channel 103, or with other devices, such as a third device 130 via communications channels 104 and 105, by operating their respective communications circuits 113 and 123. Although FIG. 1 shows the first and second devices 110 and 120 as being symmetrical, that need not be the case; the devices shown may be the same type or different types of devices. In one embodiment, for example, the first device 110 may be a stationary reader device, the second device 120 may be a mobile phone, and the third device 130 may be a Wi-Fi access point (AP).

According to one embodiment, the first device 110 and the second device 120 may utilize the first communications channel 101 (e.g., a BLE channel) to establish communication over the second communications channel 102 (e.g., a UWB channel) to exchange ranging information. In this sense, the first communications channel 101 may be considered an out-of-band (OOB) channel, and the second communications channel 102 may be considered an in-band (IB) channel, because the first communications channel 101 is used to setup the second communications channel 102. For example, the first device 110 and the second device 120 may utilize the first communications channel 101 to send and receive control messages, parameter values, and other information.

Utilizing the first communications channel 101 to setup the second communications channel 102 allows the first device 110 and the second device 120 to turn off (or transition to a lower power state) their respective second communications circuit 112 (122) when it is not in use, thereby saving power. This feature may be realized to an even greater extent if the first communications circuit 111 (121) draws less power than the second communications circuit 112 (122). By negotiating, with each other via the first communications channel 101, a start time for transmission and reception of signals over the second communications channel 102, the first device 110 and the second device 120 would know when to turn on or wake up their respective second communications circuit 112 (122), for example, prior to exchanging ranging information.

For example, the first device 110 may send, via the first communications channel 101 to the second device 120, an OOB control message that includes a start time to indicate when the first device 110 will begin sending information over the second communications channel 102. In some cases, the second device 120 may propose a start time and send, via the first communications channel 101 to the first device 110, an OOB control message that includes a start time to indicate when the first device 110 should begin sending information, such as an IB control message, over the second communications channel 102. Further control messages or other communications also may be exchanged between the first device 110 and the second device 120, via the first communications channel 101, to negotiate or establish the start time.

The OOB control message may include other information, including channel information, block interval information, round interval information, and other communications parameter values. Channel information may include what channel to use for the second communications channel 102. The block interval information may specify a time interval from the start time of an IB control message for a ranging round set to the beginning of a next ranging block. The round interval may specify a time interval from the start time of an IB control message for a ranging round set to the beginning of a next IB control message for the ranging round set. A ranging block may include an integer multiple of ranging rounds arranged as one or more ranging round sets. A ranging round corresponds to a time period during which ranging information may be exchanged by the devices, which may be a one-way exchange for OWR or a two-way exchange for TWR. A ranging round generally corresponds to a period of sufficient duration to complete a range-measurement cycle. A ranging round may be subdivided into an integer number of ranging slots, each slot corresponding to a time period for sending or receiving a ranging frame of information.

As part of the negotiations between the first device 110 and the second device 120 via the first communications channel 101, the first device 110 or the second device 120 may propose a start time such that ranging rounds are outside an operating time period of the third communications circuit 113 (123), for example, due to potential conflicts between the second communications circuit 112 (122) and the third communications circuit 113 (123) or potential interference between the second communications channel 102 and one or more of the communications channels 103, 104 and 105. In some cases, instead of proposing a start time such that ranging rounds are outside an operating time period of the third communications circuit 113 (123), the first device 110 or the second device 120 may disable or halt/reduce operations of the third communications circuit 113 (123) during the ranging rounds if it determines that the proposed ranging rounds overlap with an operating time period of the third communications circuit 113 (123). For example, the third communications circuit 113 (123) may correspond to a Wi-Fi circuit having a scheduled target wake time (TWT). Instead of scheduling the ranging rounds around the TWT by proposing a start time and/or ranging round period that reduces, avoids or minimizes the overlap, the first device 110 or the second device 120 may opt to disable the third communications circuit 113 (123) during the overlap with the ranging rounds.

In yet further cases, the first device 110 or the second device 120 may determine that the proposed ranging rounds overlap with an operating time period of the third communications circuit 113 (123) and negotiate with the third device 130 to schedule communication sessions that reduce or avoid overlapping with the ranging rounds. Continuing with the example in which the third device 130 is a Wi-Fi access point, if there is no existing TWT session, the first device 110 or the second device 120 may negotiate with the third device 130 to schedule TWT sessions to avoid the ranging rounds. If such negotiation is not successful, the first device 110 or the second device 120 may send a QoS null frame with PM=1 to the Wi-Fi AP to indicate that the first device 110 or the second device 120 cannot currently operate.

Also, as part of the negotiations between the first device 110 and the second device 120 via the first communications channel 101, the first device 110 or the second device 120 may propose using a particular channel as the second communications channel 102 to reduce or avoid potential conflicts between the second communications circuit 112 (122) and the third communications circuit 113 (123) or potential interference between the second communications channel 102 and one or more of the communications channels 103, 104 and 105. As an example, for the case in which the second communications circuit 112 (122) utilizes UWB technology, the first device 110 or the second device 120 may propose using a channel not used by the third communications circuit 113 (123), such as UWB channel 9, which has a center frequency of 7987.2 MHz, as the second communications channel 102.

After establishing a start time via OOB signaling over the first communications channel 101, the first device 110 may enable (e.g., power-on or transition from a lower power state to a higher power state) its second communications circuit 112, if not already enabled, and send an IB control message over the second communications channel 102 to the second device 120. In this case, because the first device 110 is the one sending an IB control message to the second device 120, the first device 110 may be considered a controller device, and the second device 120 that's receiving the IB control message may be considered a controlee device. The IB control message may include one or more ranging parameter values for exchanging ranging information. For the case in which the second communications channel 102 is a UWB channel, the IB control message may be a ranging control message (RCM) that specifies ranging parameters, such as the type of ranging (e.g., OWR, single-sided TWR, double-sided TWR, etc.), intervals including block and round intervals, and a number of ranging rounds. These ranging parameters in the IB control message may be the same as or similar to some of those in the OOB control message and may serve as updates to parameters previously established via OOB signaling. The first device 110 may resend the IB control message or send an updated IB control message at block and/or round intervals from the start time. The first device 110 may toggle the power state of its second communications circuit 112 in between sending the IB control messages and/or between ranging rounds to save power.

After establishing a start time via OOB signaling over the first communications channel 101, the second device 120 may determine an enable time based on the start time. For example, in determining the enable time, the second device 120 may account for a turn-on delay due to jitter and set the enable time to be a period of time (e.g., 10 milliseconds) before the start time. The second device 120 may enable (e.g., power-on or transition from a lower power state to a higher power state) its second communications circuit 122, if not already enabled, at the enable time such that the second device 120 would be ready to receive the IB control message at the start time. If the second device 120 somehow fails to receive the IB control message at the start time, the second device 120 may receive the IB control message at block and/or round intervals from the start time. The second device 120 may toggle the power state of its second communications circuit 122 in between receiving the IB control messages and/or between ranging rounds to save power.

After sending the IB control message by the first device 110 or receiving the IB control message by the second device 120, the first device 110 or the second device 120 may initiate an exchange of ranging information over one or more ranging rounds. With OWR, a one-way exchange of ranging information may be initiated between a sending device and a receiving device. For example, the first device 110 or the second device 120 (i.e., the sending device) may send one or more ranging frames, including a sending timestamp, to the other device (i.e., the receiving device). Based on the receive time of a ranging frame and the sending timestamp included in the ranging frame, the receiving device may calculate the ToF of the ranging frame and multiply the ToF by the speed of light to determine a distance between the sending device and the receiving device. With TWR, a two-way exchange of ranging information may be initiated in which both the first device 110 and the second device 120 send ranging frames to each other for determining the distance between them.

Figure 2:
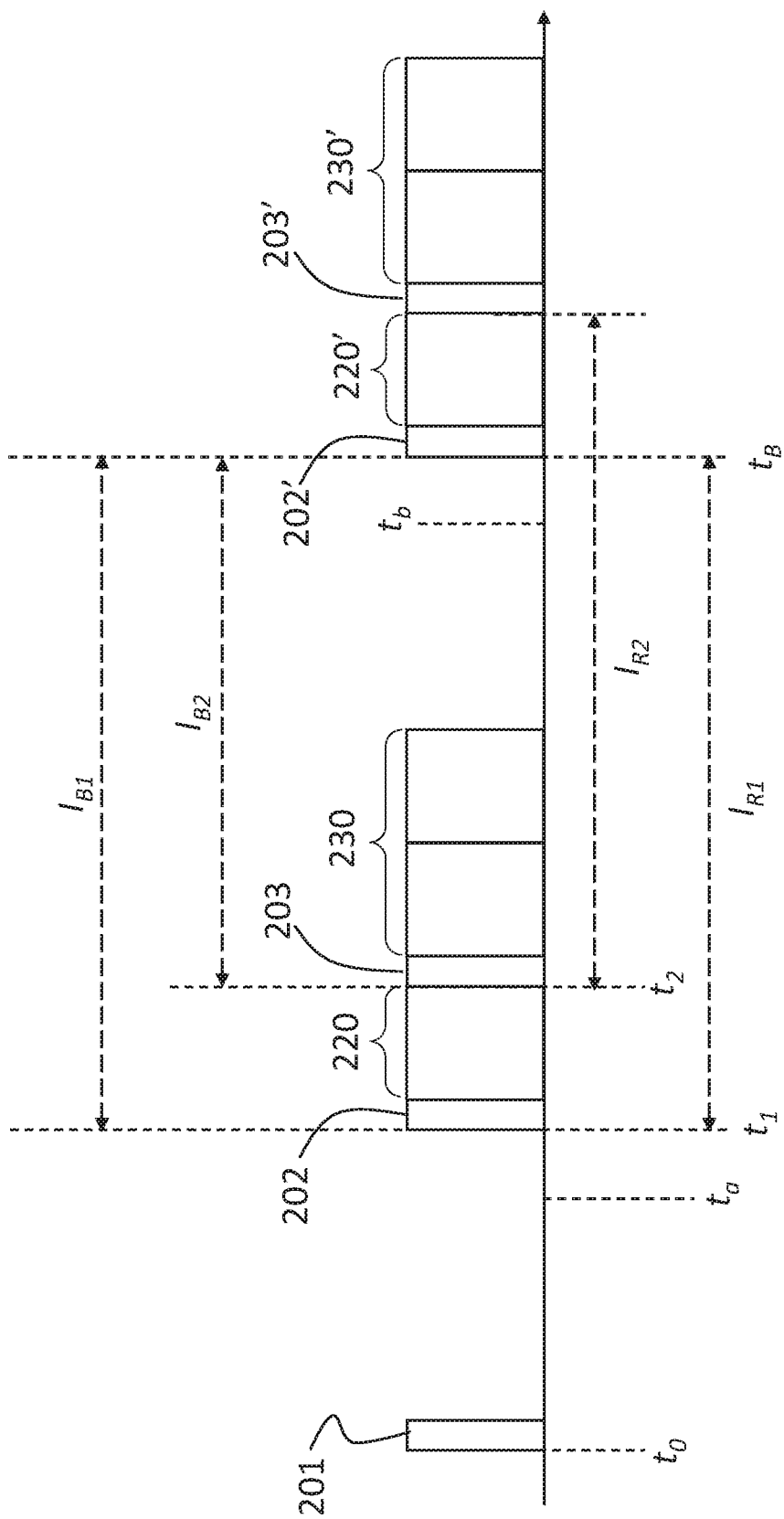
FIG. 2 illustrates a diagram of a timing for establishing communication to exchange ranging information, according to an embodiment.

FIG. 2 illustrates a diagram of a timing for establishing communication to exchange ranging information, according to an embodiment. For this example, the first device 110 is designated as the controller device and the second device 120 is designated as the controlee device for convenience of description and easier understanding. The controller (or the controlee) device may send an OOB control message 201 to the controlee (or controller) device at time $t_0$. The OOB control message 201 may include a start time $t_1$ indicating when the controller device is to send an IB control message 202 to the controlee device. The controller device may specify the start time $t_1$ relative to time $t_0$. The OOB control message 201 may also include interval information indicating when, such as relative to the start time $t_1$, the controller device would resend the IB control message 202. In this case, the interval information may include a block interval indicating the start of a next ranging block at time $t_B$. The IB control message that is re-sent may include the same and/or updated parameter values, such as updated interval information.

Having knowledge of the start time and the interval information via OOB signaling, the controlee device may enable (e.g., power-on or wake-up) its second communications circuit 122, if not already enabled, at time $t_a$, to ready itself for communicating over the second communications channel 102. The controller device may send the IB control message 202 to the controlee device at the start time $t_1$. If the controlee device misses or otherwise fails to receive the IB control message 202 at the start time $t_1$, the controlee device may disable (e.g., power-off or sleep) its second communications circuit 122 to save power and then re-enable it at time $t_b$, prior to the start of the next ranging block at time $t_B$, to ready itself again for receiving the IB control message 202 that the controller device resends. Hence, in the described embodiment, when the controlee device misses or otherwise fails to receive the IB control message 202 at the start time $t_1$, the second communications circuit 122 may be disabled and the ranging round set one 220 and the ranging round set two 230 may not be conducted.

The IB control message 202 may include parameter values for conducting ranging round set one 220, which FIG. 2 shows as having one ranging round. For example, the parameter values may include a block interval $I_{B1}$ and/or a round interval $I_{R1}$. The block interval $I_{B1}$ indicates the start of the next ranging block, relative to the start time $t_1$ of the IB control message 202. The round interval $I_{R1}$ indicates the start of a next IB control message 202' associated with a next ranging round set one 220', relative to the start time $t_1$ of the IB control message 202. For the IB control message 202 corresponding to ranging round set one 220, its parameter values of the block interval $I_{B1}$ and the round interval $I_{R1}$ are equal.

The controller may send a second control message, IB control message 203, to the controlee in the same ranging block. The IB control message 203 may include parameter values for conducting ranging round set two 230, which FIG. 2 shows as having two ranging rounds. However, for the IB control message 203 corresponding to ranging round set two 230, its parameter values of block interval $I_{B2}$ and round interval $I_{R2}$ are not equal. The block interval $I_{B2}$ indicates the start of the next ranging block, relative to the start time $t_2$ of the IB control message 203. The round interval $I_{R2}$ indicates the start of the next IB control message 203' associated with the next ranging round set two 230', relative to the start time $t_2$ of the IB control message 203.

Figure 3:
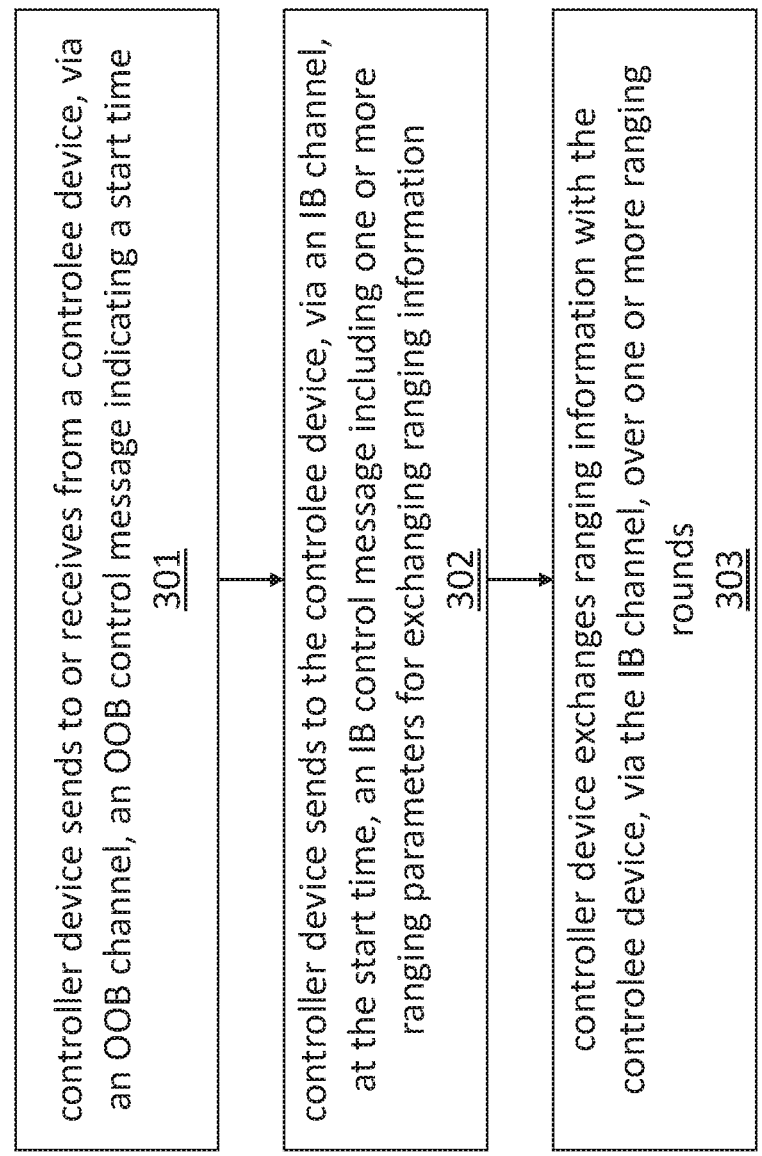
FIG. 3 illustrates a flowchart of a method by a first device for establishing communication to exchange ranging information, according to an embodiment.

FIG. 3 illustrates a flowchart of a method by the controller device for establishing communication to exchange ranging information, according to an embodiment. At 301, a controller device sends to or receives from a controlee device, via an OOB channel, an OOB control message indicating a start time. At 302, the controller device sends to the controlee device, via an IB channel, an IB control message including one or more ranging parameters for exchanging ranging information. The IB control message is sent at the start time. At 303, the controller device exchanges ranging information with the controlee device, via the IB channel, over one or more ranging rounds. The exchange may be a one-way exchange in which the controller device either sends or receives ranging information or a two-way exchange in which the controller device both sends and receives ranging information to and from the controlee device.

The OOB control message may include a time interval, and the controller device may resend the IB control message at the time interval from the start time. The OOB channel may be a BLE channel, and the IB channel may be a UWB channel. The controller device may receive from the controlee device, via the OOB channel, an indication to use a particular channel as the IB channel. Or, the controller device may send to the controlee device, via the OOB channel, an indication to use a particular channel as the IB channel. The particular channel may be UWB channel 9.

Figure 4:
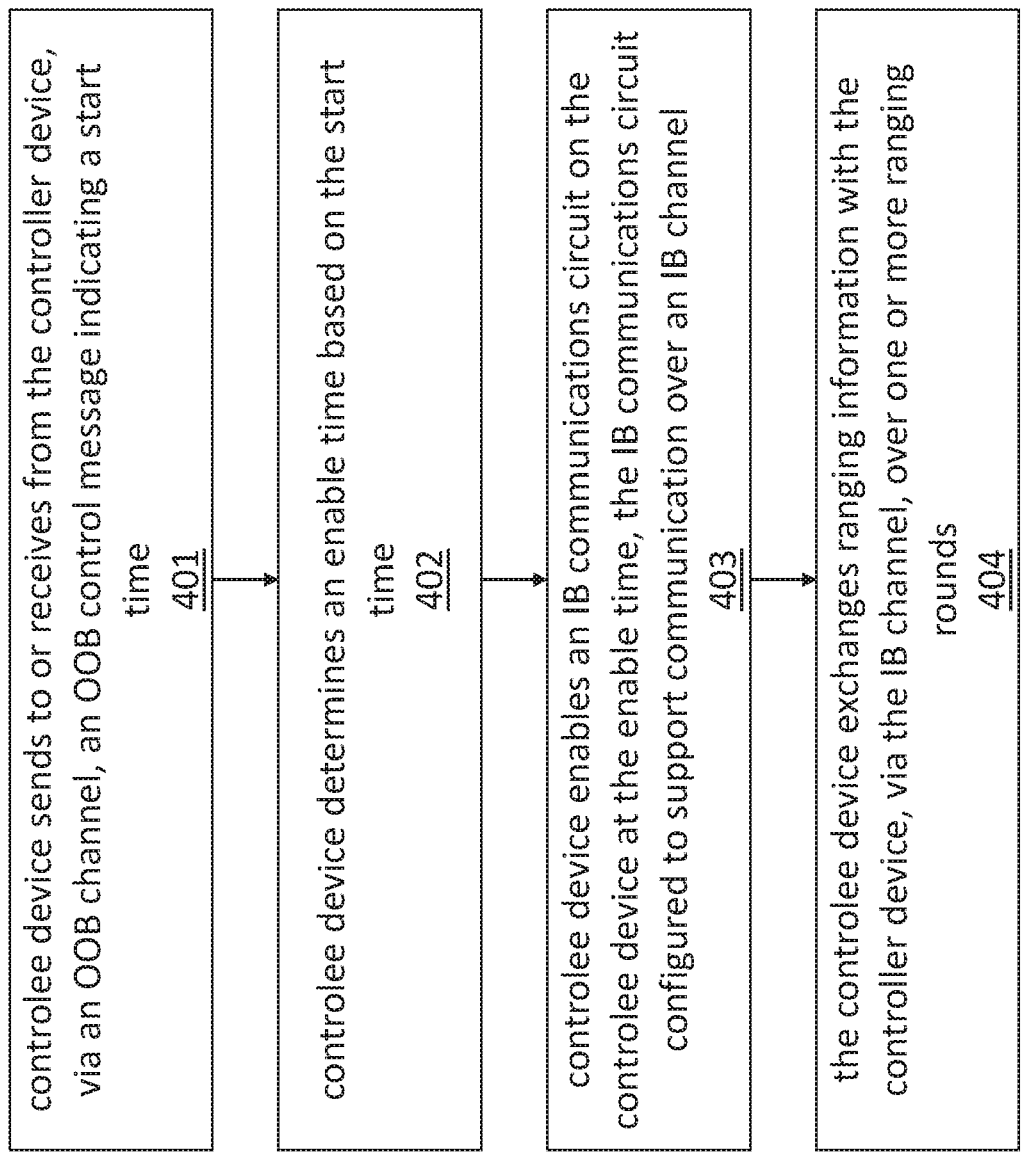
FIG. 4 illustrates a flowchart of method by a second device for establishing communication to exchange ranging information, according to an embodiment.

FIG. 4 illustrates a flowchart of method by a controlee device for establishing communication to exchange ranging information, according to an embodiment. At 401, the controlee device sends to or receives from the controller device, via an OOB channel, an OOB control message indicating a start time. At 402, the controlee device determines an enable time based on the start time. At 403, the controlee device enables an IB communications circuit on the controlee device at the enable time. The IB communications circuit is configured to support communication over an IB channel. At 404, the controlee device exchanges ranging information with the controller device, via the IB channel, over one or more ranging rounds. The exchange may be a one-way exchange in which the controlee device either sends or receives ranging information or a two-way exchange in which the controlee device both sends and receives ranging information to and from the controller device.

Prior to exchanging the ranging information, the controlee device may receive, from the controller device via the IB channel, an IB control message including ranging parameters for exchanging the ranging information. The controlee device may receive the IB control message at the start time. The OOB control message may include a time interval, and the controlee device may receive the IB control message (or an updated version thereof) at the time interval from the start time. The controlee device may disable and re-enable the IB communications circuit prior to receiving the second control message at the time interval from the start time.

The controlee may negotiate with the controller device via the IB channel, to use a particular IB channel that does not interfere with a communication channel of another communications circuit of the controlee device. The controlee device may receive from the controller device, via the OOB channel, an indication to use a particular channel, such as UWB channel 9, as the IB channel. Or, the controlee device may send to the controller device, via the OOB channel, an indication to use a particular channel as the IB channel. In some cases, the controlee may negotiate with the controller device, via the OOB channel, to schedule ranging rounds outside an operating time period of the other communications circuit of the controlee device. In further cases, the controlee device may determine that the ranging rounds overlap with an operating time period of the other communications circuit of the controlee device and disable the IB communications circuit during the ranging rounds.

Figure 5:
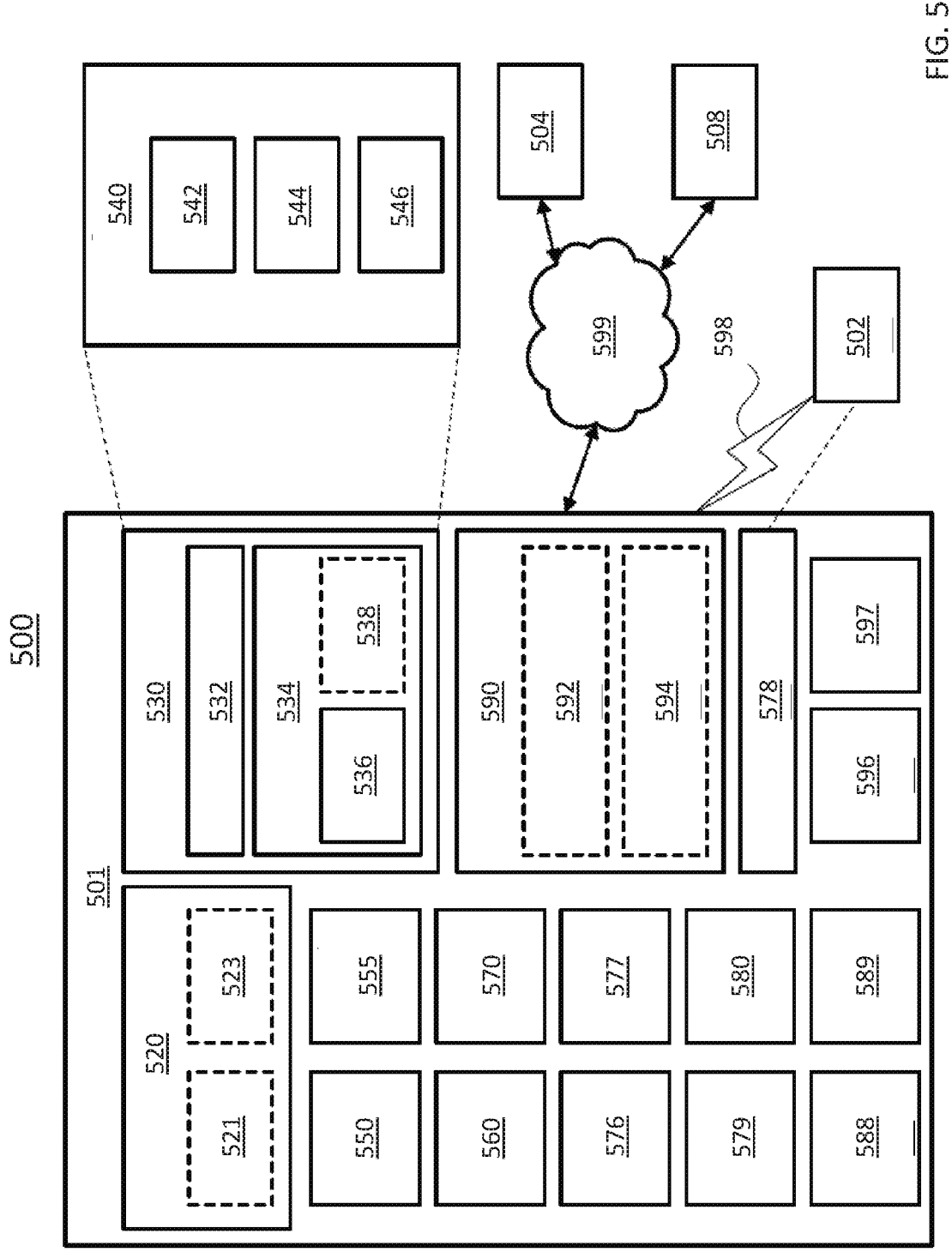
FIG. 5 illustrates a block diagram of an electronic device in a network environment, according to one embodiment.

FIG. 5 illustrates a block diagram of an electronic device 501 in a network environment 500, according to one embodiment. Referring to FIG. 5, the electronic device 501 in the network environment 500 may communicate with an electronic device 502 via a first network 598 (e.g., a short-range wireless communication network), or an electronic device 504 or a server 508 via a second network 599 (e.g., a long-range wireless communication network). The electronic device 501 may communicate with the electronic device 504 via the server 508. The electronic device 501 may include a processor 520, a memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, and/or an antenna module 597. In one embodiment, at least one (e.g., the display device 560 or the camera module 580) of the components may be omitted from the electronic device 501, or one or more other components may be added to the electronic device 501. In one embodiment, some of the components may be implemented as a single integrated circuit (IC). For example, the sensor module 576 (e.g., a fingerprint sensor, an iris sensor, or an illuminance sensor) may be embedded in the display device 560 (e.g., a display), or the display device 560 may include one or more sensors in addition to the sensor module 576.

The processor 520 may execute, for example, software (e.g., a program 540) to control at least one other component (e.g., a hardware or a software component) of the electronic device 501 coupled with the processor 520, and may perform various data processing and/or computations. As at least a part of the data processing and/or computations, the processor 520 may load a command or data received from another component (e.g., the sensor module 576 or the communication module 590) in volatile memory 532, process the command or the data stored in the volatile memory 532, and store resulting data in non-volatile memory 534. The processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, and/or execute a particular function. The auxiliary processor 523 may be implemented as being separate from, or as a part of, the main processor 521.

The auxiliary processor 523 may control at least some of the functions or states related to at least one component (e.g., the display device 560, the sensor module 576, or the communication module 590) from among the components of the electronic device 501, instead of the main processor 521 while the main processor 521 is in an inactive (e.g., sleep) state, or together with the main processor 521 while the main processor 521 is in an active state (e.g., executing an application). According to one embodiment, the auxiliary processor 523 (e.g., an image signal processor or a communication processor) may be implemented as a part of another component (e.g., the camera module 580 or the communication module 590) functionally related to the auxiliary processor 523.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 and/or the non-volatile memory 534.

The program 540 may be stored in the memory 530 as software, and may include, for example, an operating system (OS) 542, middleware 544, or an application 546.

The input device 550 may receive a command or data to be used by another component (e.g., the processor 520) of the electronic device 501, from the outside (e.g., a user) of the electronic device 501. The input device 550 may include, for example, a microphone, a mouse, and/or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. According to one embodiment, the receiver may be implemented as being separate from, or as a part of, the speaker.

The display device 560 may visually provide information to the outside (e.g., a user) of the electronic device 501. The display device 560 may include, for example, a display, a hologram device, and/or a projector and control circuitry to control a corresponding one of the display, the hologram device, and the projector. According to one embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to one embodiment, the audio module 570 may obtain the sound via the input device 550, and/or output the sound via the sound output device 555 or a headphone of an external electronic device 502 directly (e.g., wired) or wirelessly coupled with the electronic device 501.

The sensor module 576 may detect an operational state (e.g., power or temperature) of the electronic device 501 and/or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 577 may support one or more specified protocols to be used for the electronic device 501 to be coupled with the external electronic device 502 directly (e.g., wired) or wirelessly. According to one embodiment, the interface 577 may include, for example, a high definition multimedia interface (HDMI), a universal serial bus (USB) interface, a secure digital (SD) card interface, and/or an audio interface.

A connecting terminal 578 may include a connector via which the electronic device 501 may be physically connected with the external electronic device 502. According to one embodiment, the connecting terminal 578 may include, for example, an HDMI connector, a USB connector, an SD card connector, and/or an audio connector (e.g., a headphone connector).

The haptic module 579 may convert an electrical signal into a mechanical stimulus (e.g., a vibration or a movement) and/or an electrical stimulus which may be recognized by a user via tactile sensation or kinesthetic sensation. According to one embodiment, the haptic module 579 may include, for example, a motor, a piezoelectric element, and/or an electrical stimulator.

The camera module 580 may capture a still image or moving images. According to one embodiment, the camera module 580 may include one or more lenses, image sensors, image signal processors, and/or flashes.

The power management module 588 may manage power supplied to the electronic device 501. The power management module 588 may be implemented as at least a part of, for example, a power management integrated circuit (PMIC).

The battery 589 may supply power to at least one component of the electronic device 501. According to one embodiment, the battery 589 may include, for example, a primary cell which is not rechargeable, a secondary cell which is rechargeable, and/or a fuel cell.

The communication module 590 may support establishing a direct (e.g., wired) communication channel or a wireless communication channel between the electronic device 501 and the external electronic device (e.g., the electronic device 502, the electronic device 504, and/or the server 508) and performing communication via the established communication channel. The communication module 590 may include one or more communication processors that are operable independently from the processor 520 (e.g., the AP) and may support a direct (e.g., wired) communication and/or a wireless communication. According to one embodiment, the communication module 590 may include a wireless communication module 592 (e.g., a cellular communication module, a short-range wireless communication module, and/or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth®, wireless-fidelity (Wi-Fi) direct, and/or a standard of the Infrared Data Association (IrDA)) or the second network 599 (e.g., a long-range communication network, such as a cellular network, the Internet, and/or a computer network (e.g., LAN or wide area network (WAN)). Bluetooth® is a registered trademark of Bluetooth SIG, Inc., Kirkland, Wash. These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit and/or receive a signal and/or power to and/or from the outside (e.g., the external electronic device) of the electronic device 501. According to one embodiment, the antenna module 597 may include one or more antennas, and, therefrom, at least one antenna appropriate for a communication scheme used in the communication network, such as the first network 598 and/or the second network 599, may be selected, for example, by the communication module 590 (e.g., the wireless communication module 592). The signal and/or the power may then be transmitted and/or received between the communication module 590 and the external electronic device via the selected at least one antenna.

At least some of the above-described components may be mutually coupled and communicate signals (e.g., commands and/or data) therebetween via an inter-peripheral communication scheme (e.g., a bus, a general purpose input and output (GPIO), a serial peripheral interface (SPI), and/or a mobile industry processor interface (MIPI)).

According to one embodiment, commands and/or data may be transmitted and/or received between the electronic device 501 and the external electronic device 504 via the server 508 coupled with the second network 599. Each of the electronic devices 502 and 504 may be a device of a same type as, or a different type from, the electronic device 501. All or some of operations to be executed at or by the electronic device 501 may be executed at one or more of the external electronic devices 502, 504, or 508. For example, if the electronic device 501 should perform a function and/or a service automatically, or in response to a request from a user or another device, the electronic device 501, instead of, or in addition to, executing the function and/or the service, may request the one or more external electronic devices to perform at least a part of the function and/or the service. The one or more external electronic devices receiving the request may perform the at least a part of the function and/or the service requested, and/or an additional function and/or an additional service related to the request, and transfer an outcome of the performing to the electronic device 501. The electronic device 501 may provide the outcome, with or without further processing of the outcome, as at least a part of a reply to the request. To that end, a cloud computing, distributed computing, and/or client-server computing technology may be used, for example.

One embodiment may be implemented as software (e.g., the program 540) including one or more instructions that are stored in a storage medium (e.g., internal memory 536 or external memory 538) that is readable by a machine (e.g., the electronic device 501). For example, a processor of the electronic device 501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the spirit or scope of the present disclosure. Thus, the scope of the present disclosure shall not be determined merely based on the described embodiments, but rather determined based on the accompanying claims and equivalents thereof.

What is claimed is:

1. A method of establishing communication between a first device and a second device to exchange ranging information, the method comprising:
    sending, by the first device to the second device via a first channel, or receiving, by the first device from the second device via the first channel, a first control message indicating a start time;
    sending, by the first device to the second device via a second channel, a second control message including one or more ranging parameters for exchanging the ranging information, the second control message being sent at the start time, wherein the one or more ranging parameters include at least one of block intervals, round intervals, or a number of ranging rounds; and
    exchanging, by the first device with the second device via the second channel, the ranging information over one or more ranging rounds.

2. The method of claim 1, wherein:
    the first control message includes a time interval, and
    the first device resends the second control message at the time interval from the start time.

3. The method of claim 1, wherein the first channel comprises a Bluetooth® Low Energy (BLE) channel, and the second channel comprises an Ultra-wideband (UWB) channel.

4. The method of claim 1, further comprising receiving, by the first device from the second device via the first channel, an indication to use a particular channel as the second channel.

5. The method of claim 4, wherein the particular channel is Ultra-wideband (UWB) channel 9.

6. The method of claim 1, further comprising sending, by the first device to the second device via the first channel, an indication to use a particular channel as the second channel.

7. The method of claim 6, wherein the particular channel is Ultra-wideband (UWB) channel 9.

8. A method of establishing communication between a first device and a second device to exchange ranging information, the method comprising:
    sending, by the second device to the first device via a first channel, or receiving, by the second device from the first device via the first channel, a first control message indicating a start time;
    determining, by the second device, an enable time based on the start time;
    enabling a first circuit on the second device at the enable time, the first circuit being configured to support communication over a second channel;
    receiving, by the second device from the first device via the second channel, a second control message including one or more ranging parameters for exchanging the ranging information, wherein the one or more ranging parameters include at least one of block intervals, round intervals, or a number of ranging rounds; and
    exchanging, by the second device with the first device via the second channel, the ranging information over one or more ranging rounds.

9. The method of claim 8, wherein the second device receives the second control message at the start time.

10. The method of claim 8, wherein:
    the first message includes a time interval, and
    the second device receives the second control message at the time interval from the start time.

11. The method of claim 10, wherein the second device disables and re-enables the first circuit prior to receiving the second control message.

12. The method of claim 8, wherein the first channel comprises a Bluetooth® Low Energy (BLE) channel, and the second channel comprises an Ultra-wideband (UWB) channel.

13. The method of claim 8, comprising receiving, by the second device from the first device via the first channel, an indication to use a particular channel as the second channel.

14. The method of claim 13, wherein the particular channel is Ultra-wideband (UWB) channel 9.

15. The method of claim 8, comprising sending, by the second device to the first device via the first channel, an indication to use a particular channel as the second channel.

16. The method of claim 15, wherein the particular channel is Ultra-wideband (UWB) channel 9.

17. The method of claim 8, comprising negotiating, by the second device with the first device via the first channel, to schedule ranging rounds outside an operating time period of a second circuit of the second device.

18. The method of claim 8, comprising negotiating, by the second device with the first device via the first channel, to use a particular second channel that does not interfere with a communication channel of a second circuit of the second device.

19. The method of claim 8, comprising:
- determining, by the second device, that the ranging rounds overlap with an operating time period of a second circuit of the second device, and
- disabling, by the second device, the second circuit during the ranging rounds.

\* \* \* \* \*